United States Patent [19]
Haung

[11] Patent Number: 5,664,795
[45] Date of Patent: Sep. 9, 1997

[54] STROLLER WITH DOUBLE SEATS

[76] Inventor: Mark Haung, 58, Ma Yuan West St., Taichung, Taiwan

[21] Appl. No.: 508,949

[22] Filed: Jul. 24, 1995

[51] Int. Cl.$^6$ .................................................. B62B 7/00
[52] U.S. Cl. ............................ 280/47.38; 280/47.35; 280/47.4
[58] Field of Search .................................. 280/642, 647, 280/47.35, 47.38, 47.39, 47.4, 650, 658; 297/244

[56] References Cited

U.S. PATENT DOCUMENTS

| | | | |
|---|---|---|---|
| 2,711,328 | 6/1955 | Shone et al. | 280/47.35 |
| 2,769,482 | 11/1956 | Carlson | 280/47.35 |
| 2,993,702 | 7/1961 | Gill | 280/47.35 |
| 3,288,482 | 11/1966 | Gottfried et al. | 280/47.38 |
| 3,309,101 | 3/1967 | Romay | 280/47.38 |
| 3,334,909 | 8/1967 | Smith et al. | 280/47.38 |
| 3,561,787 | 2/1971 | Toda | 280/642 |
| 4,725,071 | 2/1988 | Shamie | 280/47.4 |
| 5,018,754 | 5/1991 | Cheng | 280/47.4 |
| 5,167,425 | 12/1992 | Chen | 280/47.4 |
| 5,184,835 | 2/1993 | Huang | 280/642 |
| 5,205,579 | 4/1993 | Kato et al. | 280/642 |
| 5,364,120 | 11/1994 | Shimansky | 280/650 |
| 5,370,408 | 12/1994 | Eagan | 280/642 |

FOREIGN PATENT DOCUMENTS 322851  8/1957  Switzerland ................ 280/47.35

Primary Examiner—Brian L. Johnson
Assistant Examiner—Min Yu

[57] ABSTRACT

A double-seat stroller comprises two front wheel frames, two rear wheel frames, a U-shaped pushbar with two arms, a U-shaped armrest bar disposed at the middle portion of the pushbar, a basket frame disposed under the pushbar to support a basket, a back plate disposed at the middle portion of the basket frame, and two holding bars disposed at two arms of the pushbar. A back seat plate is disposed beneath the back plate. A fastening band is disposed at the middle of the back plate. Two fastening straps are disposed at two sides of the back seat plate. A safety strap is disposed across two arms of the pushbar.

1 Claim, 4 Drawing Sheets

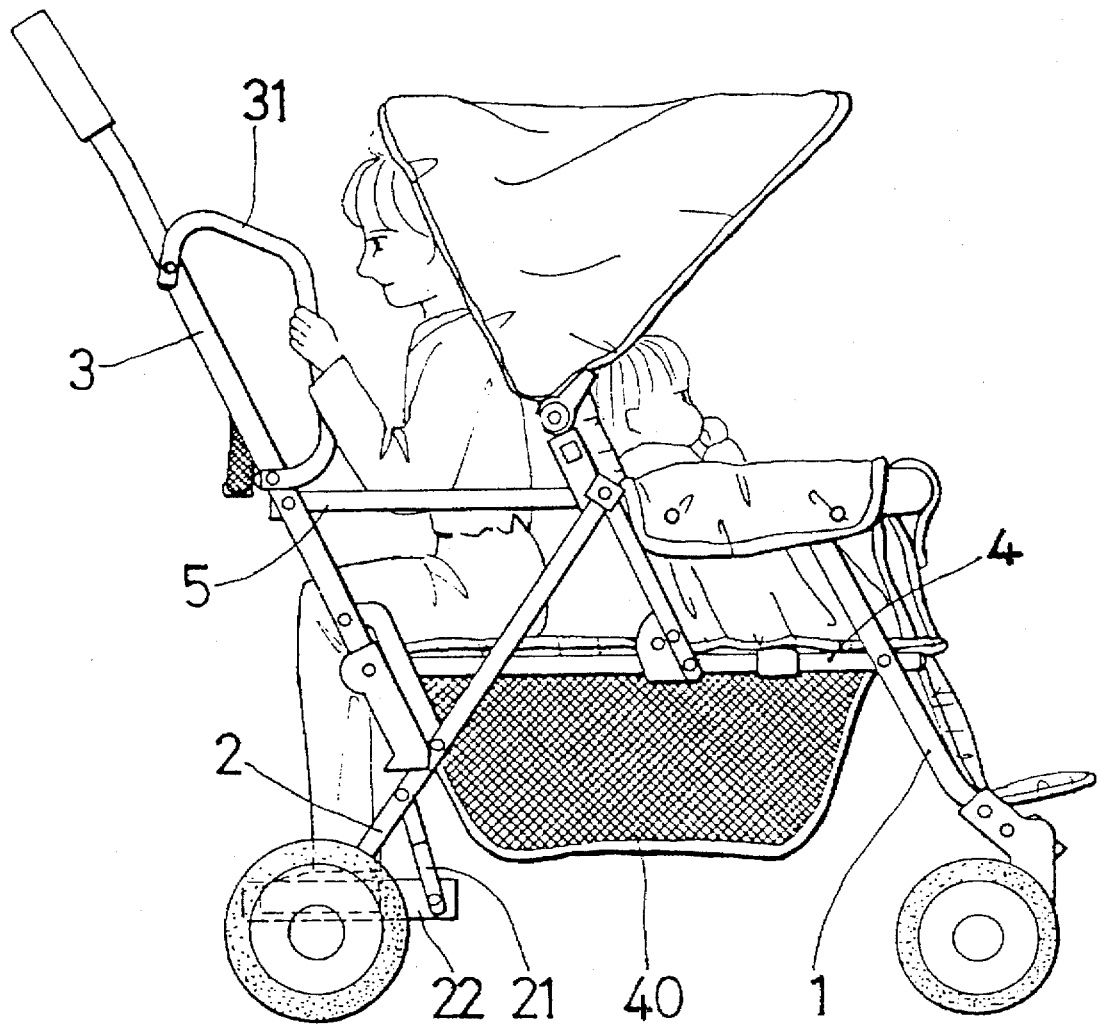
F I G. 3

STROLLER WITH DOUBLE SEATS

BACKGROUND OF THE INVENTION

The invention relates to a stroller. More particularly, the invention relates to a stroller with double seats.

A conventional double-seat stroller has two seats in the same direction. The distance of the two seats should be long enough to receive the foot and leg portions of a child in the back seat. The long stroller is not convenient for moving.

SUMMARY OF THE INVENTION

An object of the invention is to provide a double-seat stroller whose two seats are in the opposite directions so that the length of the double-seat stroller can be shortened.

Another object of the invention is to provide a double-seat stroller whose back seat can be removed to provide an interior to receive articles.

Accordingly, a double-seat stroller comprises two front wheel frames, two rear wheel frames, a longitudinal U-shaped pushbar with two arms, a generally U-shaped armrest bar disposed at the middle portion of the pushbar transversely, a generally rectangular basket frame disposed transversely under the pushbar to support a basket, and a back plate disposed at the middle portion of the basket frame to separate the front seat and the back seat. A back seat plate is disposed beneath the back plate. A safety strap is disposed across two arms of the pushbar.

BRIEF DESCRIPTION OF THE DRAWINGS

FIG. 3 is a schematic view illustrating two children seating in the two seats og FIG. 1.

DETAILED DESCRIPTION OF THE INVENTION

Figure 1:
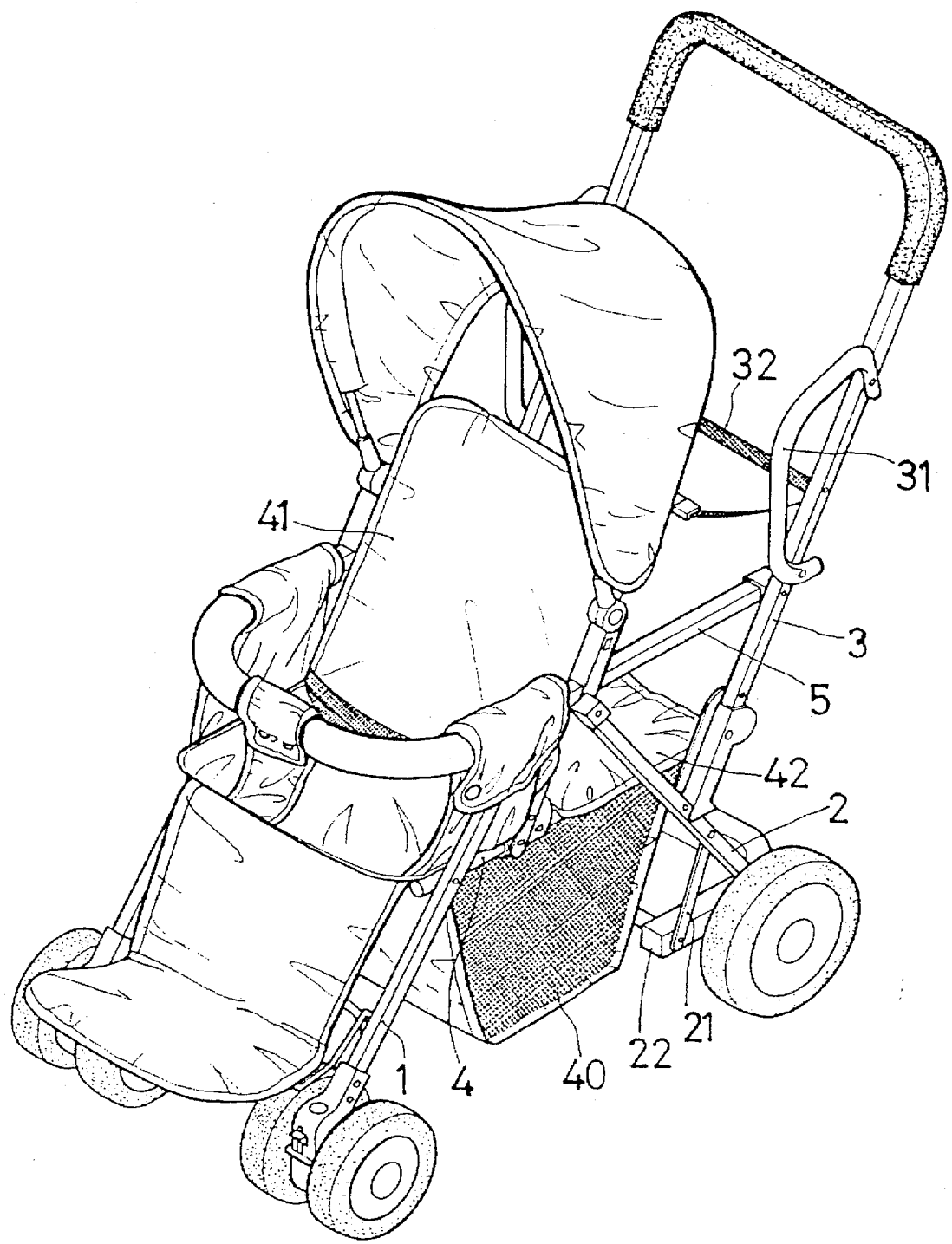
FIG. 1 is a perspective assembly view of a preferred embodiment in accordance with the invention.

Referring to FIG. 1, a double-seat stroller comprises two front wheel frames 1, two rear wheel frames 2, a longitudinal U-shaped pushbar 3, a generally U-shaped armrest bar 5 disposed at the middle portion of the pushbar 3 transversely, a generally rectangular basket frame 4 disposed transversely under the pushbar 3 to support a basket 40, a back plate 41 disposed at the middle portion of the basket frame 4 upwardly and longitudinally to separate the front seat and the back seat, and two generally C-shaped holding bars 31 disposed at two arms of the pushbar 3 and above the armrest bar 5.

Figure 2:
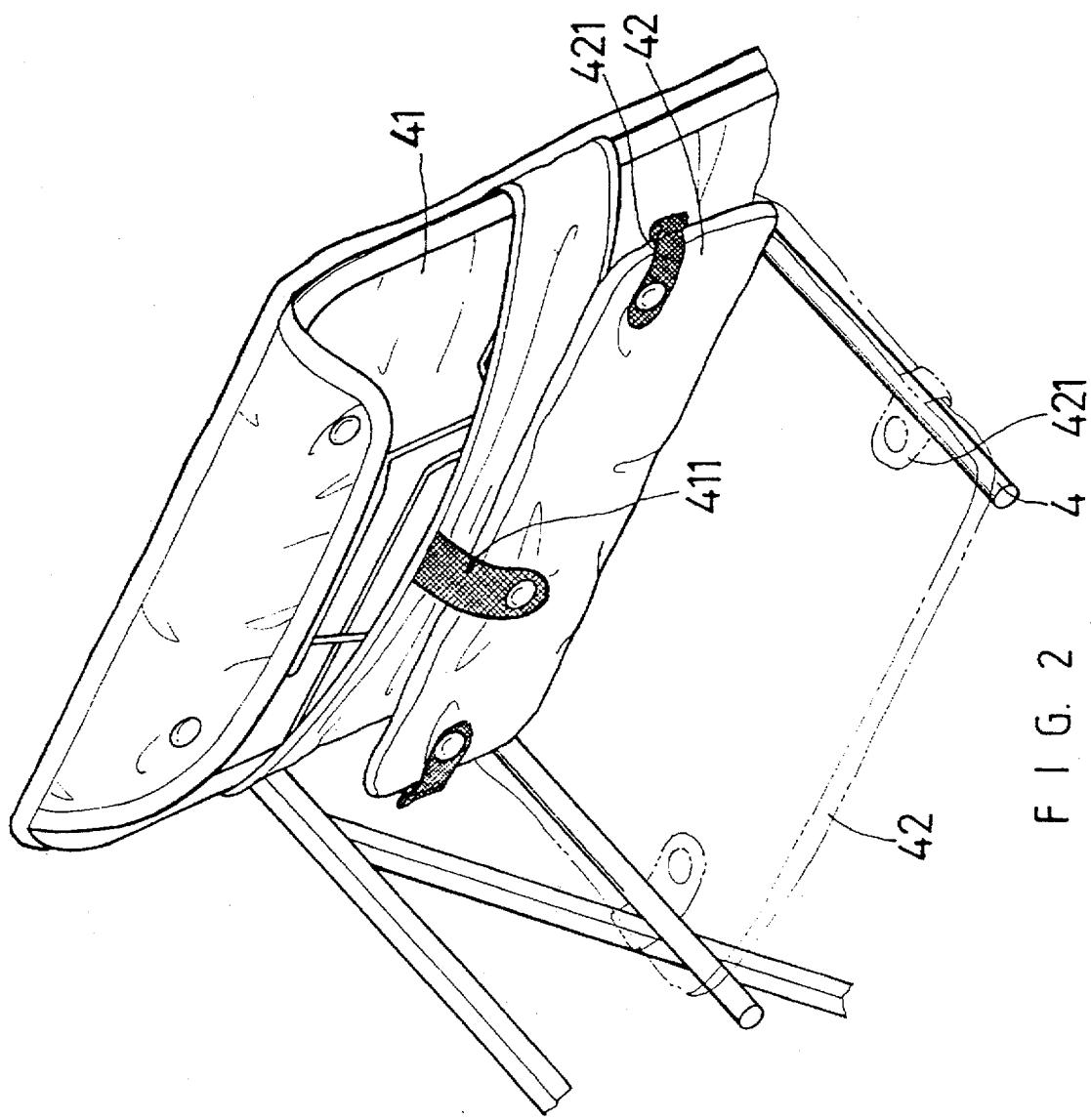
FIG. 2 is a schematic view illustrating the application of a back seat in FIG. 1.

Referring to FIGS. 1 to 3, a back seat plate 42 is disposed beneath the back plate 41. A fastening band 411 is disposed at the middle of the back plate 41 to fasten the back plate 41 and the back seat plate 42 together. Two fastening straps 421 are disposed at two sides of the back seat plate 42 to fasten the back seat plate 42 and the basket frame 4 together. Then the back seat plate 42 is placed on the basket frame 4. A pedal 22 is disposed between the two rear wheel frames 2 transversely and connected to the rear wheel frames 2 by two links 21 which are disposed at two sides of the pedal 22. A safety strap 32 is disposed across two arms of the pushbar 3.

Figure 4:
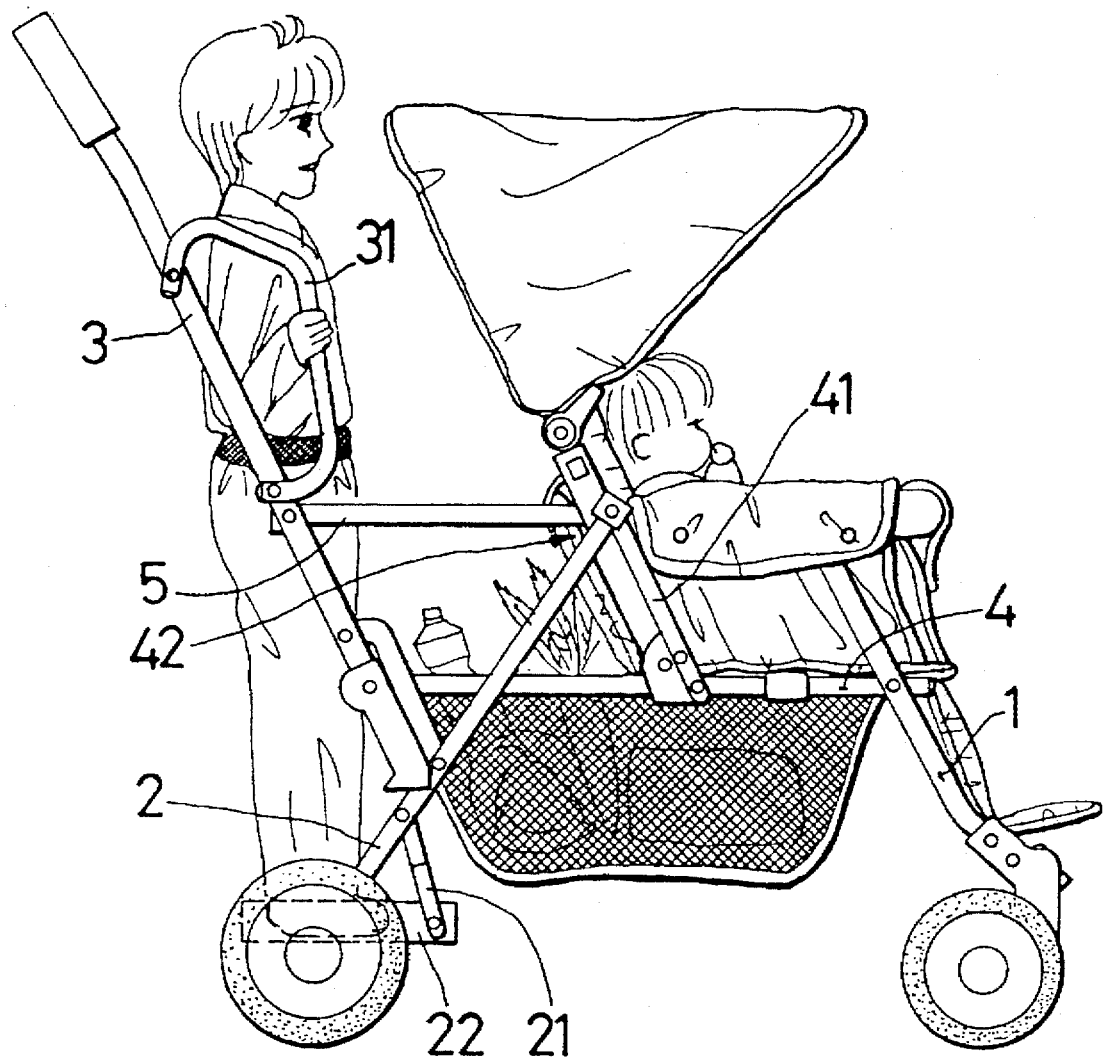
FIG. 4 is a schematic view illustrating that the back seat is removed to provide an interior to receive articles.

Referring to FIGS. 3 and 4, the back seat plate 42 is placed on the basket frame 4 and two children sit in the two seats. If a child does not like to sit, the safety strap 32 can be used to fasten the waist of the child while the child stands beside the stroller. When the back seat is empty, the back seat plate 42 is fastened to the back plate 41 so that the basket 40 can receive articles.

The invention is not limited to the above embodiment but various modification thereof may be made. It will be understood by those skilled in the art that various changes in form and detail may be made without departing from the spirit and scope of the invention.

What is claimed is:

1. A double-seat stroller comprising:

two front wheel frames, two rear wheel frames, a longitudinal U-shaped pushbar having two arms, a generally U-shaped armrest bar disposed at the middle portion of the pushbar transversely, a generally rectangular basket frame disposed transversely under the pushbar to support a basket, a basket connected to the basket frame, a front seat connected to the U-shaped armrest bar and disposed over a front portion of the basket frame, a back seat connected to the front seat, the front seat and the back seat facing opposite directions, a back plate disposed at the middle portion of the basket frame upwardly and longitudinally, the back plate separating the front seat and the back seat, two generally C-shaped holding bars disposed at two arms of the pushbar and above the armrest bar, a back seat plate disposed beneath the back plate, the back seat plate movable to a position fastened with the back plate and to a position fastened with the basket frame, a fastening band disposed at the middle of the back plate to fasten the back plate and the back seat plate together, two fastening straps disposed at two sides of the back seat plate to fasten the back seat plate and the basket frame together, a pedal disposed between the two rear wheel frames transversely and connected to the rear wheel frames by two links, two links disposed at two sides of the pedal, a safety strap disposed across two arms of the pushbar, and the back seat plate placed on the basket frame.

* * * * *